United States Patent [19]

Lee et al.

[11] 4,365,110

[45] Dec. 21, 1982

[54] MULTIPLE-DESTINATIONAL CRYPTOSYSTEM FOR BROADCAST NETWORKS

[75] Inventors: Lin-Nan Lee, Germantown, Md.; Shyue-Ching Lu, Taiwan, Taiwan

[73] Assignee: Communications Satellite Corporation, Washington, D.C.

[21] Appl. No.: 45,703

[22] Filed: Jun. 5, 1979

[51] Int. Cl.³ ............................................... H04L 9/00
[52] U.S. Cl. ............................. 178/22.10; 178/22.09; 178/22.17; 370/10; 370/112
[58] Field of Search ...................... 370/18, 19, 21, 22, 370/112, 113; 178/22, 22.07, 22.10, 22.11; 375/2, 2.1

[56] References Cited

U.S. PATENT DOCUMENTS

| | | | |
|---|---|---|---|
| 3,204,035 | 8/1965 | Balbard et al. | 370/21 |
| 3,384,715 | 5/1968 | Higuchi et al. | 370/21 |
| 3,488,445 | 1/1970 | Chang | 370/19 |
| 3,510,595 | 5/1970 | Gutteber | 370/18 |
| 3,715,508 | 2/1973 | Blasbalg | 370/19 |

*Primary Examiner*—Sal Cangialosi
*Attorney, Agent, or Firm*—Sughrue, Mion, Zinn, Macpeak & Seas

[57] ABSTRACT

A method of protecting communications through encryption is disclosed which is particularly useful for multiplexed communications. On the transmit side, each message is multiplied by an enciphering key corresponding to its destination, and the products are all added together to form a cryptogram. Each receiving station divides the entire cryptogram by its own deciphering key to obtain the message intended for that station.

9 Claims, 2 Drawing Figures

MULTIPLE-DESTINATIONAL CRYPTOSYSTEM FOR BROADCAST NETWORKS

BACKGROUND OF THE INVENTION

This invention relates to a method of providing communications security, and more particularly, to a method of providing communications security in a multiplexed communications system.

In modern communications systems, multiplexing is commonly used in order to make maximum use of the available band width. Such a technique is particularly useful in communications satellite networks. Shown in FIG. 1 is a brief block diagram of a typical broadcast satellite network in which the signals from a plurality of sources $S_1$-$S_n$ are combined by multiplexer 10 into a single communication signal which is then transmitted by a modem 12 to a satellite 14. The satellite retransmits the multiplexed signal to each of the receiving modems 16 which, in turn, provide the received signal to demultiplexers 18. The demultiplexers 18 separate from the multiplexed signal the portion intended for their respective destinations $D_1$-$D_n$. This type of operation is quite well known.

In some applications, it is desirable to encode some or all of the transmitted information in order to prevent access to that information by unauthorized persons. However, the encoding and decoding of multiplexed communications signals has been difficult to accomplish satisfactorily. There are two commonly used techniques for providing communication security in broadcast networks. One is to encipher the messages before multiplexing at the point designated by reference numerals 1(a) in FIG. 1 and to decipher the messages after demultiplexing at the point shown by reference numeral 1(b) in FIG. 1. The disadvantage of this technique is that the information from each source must be completely enciphered prior to the multiplexing operation and, therefore, each source must have its own complete enciphering equipment. A further disadvantage is that the encryption and decryption of each channel is completely independent of all other multiplexed channels. With each channel thus exposed to isolated cryptanalysis attack, it may be necessary to utilize a rather complicated encryption scheme for each channel.

A second commonly used technique is to encipher after the multiplexing operation as shown by reference numeral 2(a) in FIG. 1 and to then decipher prior to demultiplexing as shown by reference numeral 2(b) in FIG. 1. The major disadvantage of the second technique is that the enciphering equipment must have the capability of recognizing the destination of each individual message within the common multiplexed signal and change the enciphering keys dynamically if it is desirable to use different enciphering and deciphering keys for different destinations. If a somewhat sophisticated encryption scheme is desired to maintain communication security the requirement that such a sophisticated apparatus be capable of dynamically changing enciphering keys may result in a rather costly apparatus. Also, this second technique suffers from the same disadvantage as the first technique in that the encryption and decryption of each individual message within the multiplexed signal is independent of the other messages within the signal, thus exposing each message to an isolated cryptanalysis attack.

SUMMARY OF THE INVENTION

It is an object of the present invention to provide a cryptosystem particularly useful for multiple-destionational broadcast networks in which each source does not require complete enciphering equipment.

It is a further object of this invention to provide such a cryptosystem which does not require complicated enciphering equipment capable of dynamically changing the enciphering key for enciphering individual messages in a multiplexed signal.

It is a further object of this invention to provide a cryptosystem for multiplexed communications in which the encryption and decryption of each of the messages within the multiplexed signal is not independent of the encryption and decryption of the remaining signals in the message.

It is a still further object of this invention to provide a cryptosystem which provides all of the above advantages while simultaneously providing a significant savings in the cost and complexity of the multiplexing and demultiplexing equipment.

Briefly, these and other objects are achieved according to the present invention by combining the various messages into a signal cryptogram and deciphering the cryptogram at each destination by a different decryption key to thereby obtain the message portion of the cryptogram intended for that particular destination. In the method according to the present invention, the encipherer multiplies each message with an enciphering key corresponding to the desired destination, and all of the products are summed to form a single cryptogram. At the received side, each station divides the received cryptogram by its own deciphering key and the message intended for each destination will be the remainder of the division operation. The only hardware required for the cryptosystem according to the present invention is a multiplier for each of the sources, a single adder for combining the various products, and dividers for each of the destinations. Message security is enhanced since the cryptogram is a function of the combined messages of all sources rather than merely an individual encryption of each of the messages. The adder will serve substantially the same function as a conventional multiplexer and the dividers will serve substantially the same purpose as conventional demultiplexers, thus greatly simplifying the system hardware.

BRIEF DESCRIPTION OF THE DRAWINGS

The present invention will be more clearly understood with reference to the following explanation in conjunction with the accompanying drawings in which.

DETAILED DESCRIPTION OF THE INVENTION

The cryptosystem according to this invention is based on the Chinese Remainder Theorem which states the following:

If $p_i$ are prime numbers where $1 \leq i \leq n$, P is defined as the product of all $p_i$, $d_i$ is defined as $(P/p_i)$, $c_i$ is defined as the product of $d_i$ and $(d_i^{-1} \bmod p_i)$ and zero $< m_i < p_i$ for $1 \leq i \leq n$, let a cryptogram x be defined as $$x = [\Sigma m_i c_i] \bmod P, \quad (1)$$

then $$m_i = x \bmod p_i. \quad (2)$$

In the above Theorem, K mod r is defined as the remainder of (K/r) and $(d_i{}^{-1} \bmod p_i)$ is the inverse of $d_i$ in mod $p_i$, i.e., the remainder of $[d_i \cdot (d_i{}^{-1} \bmod p_i)/p_i]$ is equal to one. For instance, if $p_i = 5$ and $d_i = 3$, $(d_i{}^{-1} \bmod p_i)$ is some number k such that the remainder of 3k/5 is 1. Thus, $(d_i{}^{-1} \bmod p_i)$ will equal 2.

If $c_i$ is the enciphering key for message $m_i$ which is destined for station i, the crytogram x is a scrambled message which contains all of the information of messages $m_1, m_2, \ldots, m_n$ from sources $S_1, S_2, \ldots, S_n$. Each destination may then use its own secret deciphering key $p_i$ to recover its intended message $m_i$ from the cryptogram x according to equation (2). Although each station receives the entire cryptogram containing all of the multiplexed information, only its respective message $m_i$ can be recovered.

Figure 2:
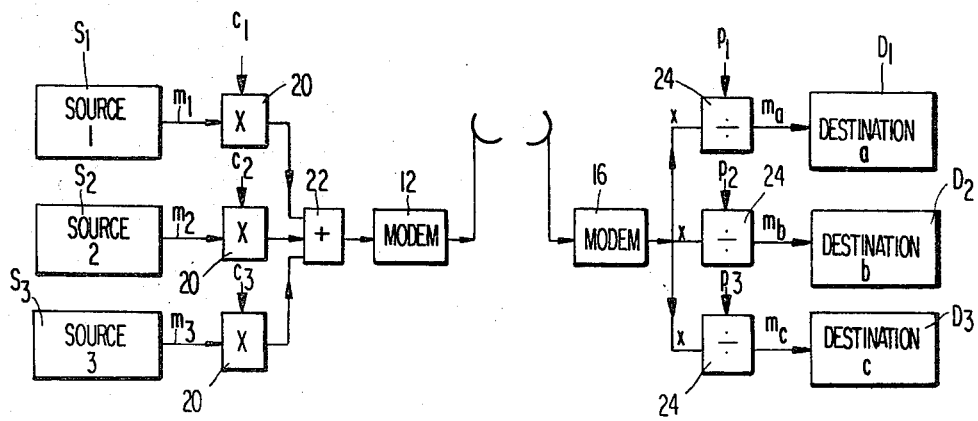
FIG. 2 is a block diagram of a satellite broadcast network utilizing the cryptosystem according to the present invention.

The implementation of the cryptosystem according to the present invention is quite simple and can be clearly understood with reference to FIG. 2. In FIG. 2, the system is illustrated for three sources and three destinations but this is for illustrative purposes only and it should be readily appreciated that the system is not limited to any particular number of stations within the communications network. Each of the sources $S_1$–$S_3$ provides a respective message $m_1$–$m_3$ intended for a particular destination $D_1$–$D_3$. The transmitting station is provided with n multipliers 20, where n is the number of source-destination pairs handled at the particular transmitting station. The messages are multiplied by an enciphering key corresponding to the intended destination. In FIG. 2, source $S_1$ provides a message $m_1$ intended for destination $D_1$ and, therefore, this message is multiplied by an enciphering key $c_1$. The multiplier outputs are combined in an adder 22 which provides at its output the input sum (mod P) or, in other words, the remainder of the (input sum/P). Thus, the output of the mod P adder 22 is the crytogram x given by equation (1).

The multipliers 20 may either be conventional multipliers providing products $m_i c_i$ at their outputs or they may be mod P multipliers which provide outputs $m_i \cdot c_i$ (mod P). This would result in significantly smaller inputs to the adder 22 thereby decreasing the size requirements of the adder, but it would be at a cost of a slight increase in the complexity of the multipliers and, therefore, may not be desirable in some cases. The result at the output of adder 22 would be the same.

The cryptogram x is transmitted by modem 12 to receiving modem 16 and is supplied in parallel to each of the dividers 24. The dividers 24 each divide the entire cryptogram x by a respective divisor $p_i$, the remainder of this division being provided to the respective destination as the information signal $m_i$ according to equation (2).

Figure 1:
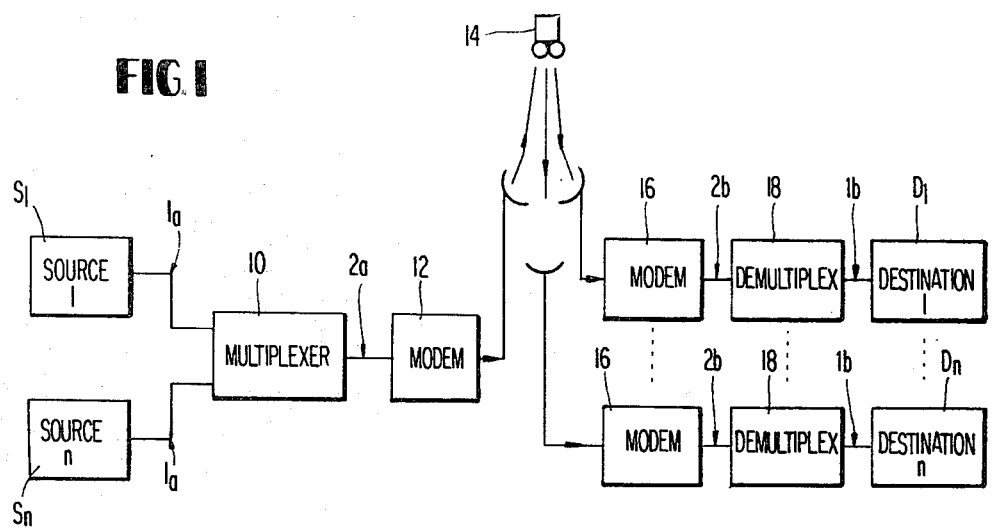
FIG. 1 is a brief block diagram of a conventional broadcast satellite network.

Although there is only a single receiving modem 16 shown in FIG. 2, this is merely for the purposes of illustrating that a single received signal can be provided simultaneously to a plurality of destinations each of which will be capable of only recovering its intended information. The invention could also have been illustrated by merely altering FIG. 1 by replacing each of the multiplexers 18 with a corresponding divider 24, by replacing the multiplexer 10 by the adder 22, and, providing multipliers 20 at the position designated by reference numerals 1(a) in FIG. 1.

Further, although FIG. 2 is illustrative of a system in which each source provides a single message intended for a single and unique destination, this is not a requirement of the system. For example, the source $S_1$ is illustrated as providing a single message $m_1$ to be multiplied by an enciphering key $c_1$ and recovered only at destination $D_1$. However, the message $m_1$ from source $S_1$ could also be provided to a further multiplier (not shown) for multiplication by a further enciphering key, for example, $c_2$. The output of this further multiplier would then be added with the other multiplier outputs in the adder 22, and the message $m_1$ would then also be recoverable at destination $D_2$. This, however, may result in difficulty in the destination $D_2$ determining the origin of the received messages and, therefore, a preferable alternative may be to provide a fourth enciphering key, $c_4$ for the additional multiplier and to then provide an additional divider at the input to destination $D_2$ which will divide by $p_4$. In this way, each of the sources would be provided with a number of multipliers corresponding to the number of destinations intended for the messages from that source, and each of the destinations would be provided with a plurality of dividers equal in number to the sources from which it receives messages. All multipliers would use unique enciphering keys $c_i$, all dividers would use unique deciphering keys $p_i$ and any source-destination combination would be possible.

In the above description, the multipliers 20 were considered to be located at the transmitting station, but this is not a requirement of the system. If the band width between the sources $S_i$ and the transmitting station is sufficient, it would be possible to place the multipliers at the sources themselves and thus provide some degree of communication security between the sources and the transmitting station.

It should be noted that this is the first cryptosystem designed for multi-destinational broadcast networks such as satellite networks, in which messages to different destinations are blended together to increase the strength of the cryptosystem. The cryptosystem according to the present invention is particularly attractive for TDMA. applications where information is transmitted in bursts. With this system the cryptogram x is transmitted by the entire burst as a single entity and the cryptanalyst must record the entire burst. In contrast, conventional TDMA bursts contain a number of sub-bursts which are destined for different stations, and a cryptanalyst need record only the subbursts to the particular destination of interest.

It should be noted that the cryptosystem according to the present invention is not a public-key cryptosystem since the deciphering key $p_i$ could be relatively easily derived from the number P and the enciphering key $c_i$. Further, although the cryptosystem is believed secure against cipher-text attack, i.e., an attack through the comparison of a known text and the cryptogram corresponding to that text, this will not be true if the cryptanalyst has more than one pair of plain text and cryptogram. However, this should not present a severe problem in the encryption of high data rate broadcast networks, since it is usually difficult to identify a particular pair of plain text and cryptogram from a large volume of encrypted data. In addition, the enciphering and deciphering keys could be periodically changed in order to increase security.

Part of the strength of the cryptosystem lies in the blending together of the different messages intended for different destinations and, thus, it may appear that the strength of the cryptosystem would suffer when only two destinations are involved. This difficulty could be overcome, however, with relatively slight modifications to the disclosed system. For example, a particular source-destination pair may be given two pairs of enciphering and deciphering keys, and the messages can be multiplied by the enciphering keys alternately. Thus, the number of combined messages could be effectively increased even though there are only two physical destinations.

Described hereinabove is one embodiment of a cryptosystem which is particularly suitable for broadcast satellite communications networks and provides communication security while simultaneously permitting significant simplification of the multiplexing hardware. It should be apparent that various modifications could be made to the above-disclosed embodiment without departing from the true spirit and scope of the invention as defined in the appended claims.

What is claimed:

1. A method of sending a plurality of messages in the form of a single tranmission signal through a single transmitting station to a plurality of destinations through at least one receiving station comprising;
   multiplying each of said messages by an enciphering key corresponding to its intended destination;
   combining the products of said multiplication step into a cryptogram comprising said single transmission signal,
   said cryptogram being defined by $$x = [\Sigma m_i c_i] \bmod P,$$

where P is the product of a plurality of prime numbers $p_i$, $c_i$ are the enciphering keys corresponding to respective destinations and are defined by $c_i = d_i (d_i^{-1} \bmod p_i)$, $d_i$ is defined by $P/p_i$, $m_i$ are numbers representing said plurality of messages, $0 < m_i < p_i$ and $1 \leq i \leq n$;
   transmitting said cryptogram to said at least one receiving station; and
   dividing the received cryptogram by divisors corresponding to respective destinations to thereby recover the messages intended for each of said destinations.

2. The method according to claim 1, wherein each message $m_i$ is given by x mod $p_i$, so that the messages intended for each of said destinations will be given by the remainder of the division of said cryptogram by each of said corresponding deciphering keys.

3. The method according to claim 1 wherein said plurality of messages originate from a plurality of sources so that each source-destination pair is assigned an enciphering key and a corresponding deciphering key, further comprising:
   assigning to at least one of said source-destination pairs an additional enciphering and corresponding deciphering key;
   alternately multiplying the messages from the source in said at least one source-destination pair by two different enciphering keys; and
   dividing the received cryptogram by two different deciphering keys in order to recover the messages intended for the destination in said at least one source-destination pair.

4. In a communications system of the type in which plural messages are sent in the form of a single transmission signal from a single transmitting station to a plurality of destinations through at least one receiving station, the improvement comprising:
   a plurality of multipliers for multiplying each of said messages by an enciphering key corresponding to its intended destination;
   adding means for combining the outputs from said multipliers to form a cryptogram containing each of said messages and comprising said single transmission signal; and
   dividing means for dividing said cryptogram by deciphering keys corresponding to said plurality of destinations to thereby derive from said cryptogram the messages intended for each destination; the improvement comprising:

a cryptogram defined by $$x = [\Sigma m_i c_i] \bmod P,$$

where P is the product of a plurality of prime numbers $p_i$, $c_i$ are the enciphering keys corresponding to respective destinations and are defined by $c_i = d_i (d_i^{-1} \bmod p_i)$, $d_i$ is defined by $P/p_i$, $m_i$ are numbers representing said plurality of messages, $0 < m_i < P_i$ and $1 \leq i \leq n$.

5. The system according to claim 4, wherein the message $m_i$ intended for each destination is given by x mod $p_i$.

6. The system according to claim 4, wherein the messages originate at a plurality of sources and the multipliers are located at the sources to provide a degree of communication security between the sources and the said single transmitting station.

7. The system according to claim 6 wherein the number of multipliers corresponds to the number of source-destination pairs handled by said transmitting station.

8. The system according to claim 4, wherein said adding means is a mod P adder.

9. The system according to claim 4, wherein said multipliers are mod P multipliers.

* * * * *

UNITED STATES PATENT AND TRADEMARK OFFICE
CERTIFICATE OF CORRECTION

PATENT NO. : 4,365,110

DATED : December 21, 1982

INVENTOR(S) : Lee et al

It is certified that error appears in the above-identified patent and that said Letters Patent is hereby corrected as shown below:

Column 3, line 67 - change "multiplexers" to --demultiplexers--;

Column 4, line 45 - change "TDMA." to --TDMA--.

Signed and Sealed this

Twelfth Day of April 1983

[SEAL]

Attest:

GERALD J. MOSSINGHOFF

Attesting Officer

Commissioner of Patents and Trademarks